US009740877B2

(12) United States Patent
Medvedev (10) Patent No.: US 9,740,877 B2
(45) Date of Patent: Aug. 22, 2017

(54) SYSTEMS AND METHODS FOR DATA LOSS PREVENTION WHILE PRESERVING PRIVACY

(71) Applicant: GOOGLE INC., Mountain View, CA (US)

(72) Inventor: Ivan Medvedev, Bellevue, WA (US)

(73) Assignee: GOOGLE INC., Mountain View, CA (US)

( * ) Notice: Subject to any disclaimer, the term of this patent is extended or adjusted under 35 U.S.C. 154(b) by 122 days.

(21) Appl. No.: 14/862,086

(22) Filed: Sep. 22, 2015

(65) Prior Publication Data

US 2017/0083717 A1    Mar. 23, 2017

(51) Int. Cl.
  *H04L 29/06* (2006.01)
  *G06F 21/62* (2013.01)
  *G06F 21/60* (2013.01)
  *H04L 9/30* (2006.01)
  (Continued)

(52) U.S. Cl.
  CPC ........ *G06F 21/6218* (2013.01); *G06F 21/602* (2013.01); *G06F 21/6245* (2013.01); *H04L 9/302* (2013.01); *H04L 63/0428* (2013.01); *H04W 12/02* (2013.01); *H04W 12/12* (2013.01)

(58) Field of Classification Search
  None
  See application file for complete search history.

(56) References Cited

U.S. PATENT DOCUMENTS 7,996,374 B1    8/2011   Jones et al.
8,065,739 B1    11/2011  Bruening et al.
(Continued)

OTHER PUBLICATIONS

X. Shu, D. Yao and E. Bertino, "Privacy-Preserving Detection of Sensitive Data Exposure," in IEEE Transactions on Information Forensics and Security, vol. 10, No. 5, pp. 1092-1103, May 2015. doi: 10.1109/TIFS.2015.2398363.*

(Continued)

*Primary Examiner* — Dede Zecher
*Assistant Examiner* — Vadim Savenkov
(74) *Attorney, Agent, or Firm* — Procopio, Cory, Hargreaves & Savitch LLP (57) ABSTRACT

Systems and methods for data loss prevention while preserving privacy are described, including receiving a data communication originating from an online account of a user device associated with the enterprise; performing an analysis to determine that the data communication is a candidate data leakage, based on a context of the data communication; encrypting the data communication, and providing the host-encrypted data communication to a software agent at the enterprise; receiving a software agent-encrypted database of enterprise communication and the host-encrypted data communication, re-encrypted by the software agent; decrypting a host-encrypted aspect of the re-encrypted data communication to generate a software agent-encrypted data communication; performing a matching operation to determine whether a match exists between the encrypted database of information and the software agent-encrypted data communication; if the match exists, reporting the match to the software agent; and if the match does not exist, the host taking an action.

20 Claims, 8 Drawing Sheets

(51) Int. Cl.
*H04W 12/02* (2009.01)
*H04W 12/12* (2009.01)

(56) References Cited

U.S. PATENT DOCUMENTS

| | | | |
|---|---|---|---|
| 8,181,036 B1* | 5/2012 | Nachenberg | H04L 63/1416 709/224 |
| 8,416,709 B1 | 4/2013 | Marshall et al. | |
| 8,468,244 B2 | 6/2013 | Redlich et al. | |
| 8,555,383 B1 | 10/2013 | Marshall et al. | |
| 8,565,108 B1 | 10/2013 | Marshall et al. | |
| 8,572,758 B1 | 10/2013 | Clifford | |
| 8,800,024 B2 | 8/2014 | Cooper et al. | |
| 8,826,443 B1 | 9/2014 | Raman et al. | |
| 9,077,703 B1 | 7/2015 | Goshen et al. | |
| 2007/0240224 A1* | 10/2007 | Agrawal | G06F 17/30445 726/25 |
| 2009/0158430 A1 | 6/2009 | Borders | |
| 2009/0241173 A1* | 9/2009 | Troyansky | G06F 21/552 726/5 |
| 2009/0328216 A1* | 12/2009 | Rafalovich | H04L 43/0876 726/23 |
| 2012/0110174 A1* | 5/2012 | Wootton | G06F 21/564 709/224 |
| 2012/0151581 A1* | 6/2012 | Kang | G06F 21/554 726/22 |
| 2012/0210434 A1 | 8/2012 | Curtis et al. | |
| 2013/0246334 A1 | 9/2013 | Ahuja et al. | |
| 2015/0163121 A1 | 6/2015 | Mahaffey et al. | |
| 2015/0163206 A1 | 6/2015 | McCarthy et al. | |
| 2015/0286825 A1* | 10/2015 | Freudiger | G06F 21/60 726/26 |

OTHER PUBLICATIONS

Symantec Data Loss Prevention for Endpoint, Symantec, 2011, 3pgs.
Data Loss Prevention, R77 Versions, Administration Guide, Check Point Software Technologies Ltd., May 5, 2015, 183 pgs.
Kanagasingham, P., Data Loss Prevention, SANS Institute InfoSec Reading Room, Aug. 15, 2008, 38 pgs.
McAfee Data Loss Prevention 9.2 Software, Product Guide, McAfee, 2011, 138 pgs.
Understanding and Selecting a Data Loss Prevention Solution, SANS Institute, Securosis, L.L.C., [retrieved on Jul. 20, 2015], 26 pgs.
Sahay, S., Evolving Data Loss Prevention in SharePoint Online/ OneDrive for Business and Office Applications, Office Blogs, Jul. 19, 2015, 7 pgs.
Data Loss Prevention for OEMs, Sophos, 2013, 2 pgs.
International Search Report and Written Opinion for PCT App No. PCT/US2016/053116 dated Nov. 25, 2016, 15 pgs.
Agrawal, R., et al., Information Sharing Across Private Databases, SIGMOD 2003, Proceedings of the ACM Sigmod International Conference on Management of Data,Jun. 9-12, 2003, San Diego, CA, 12 pgs.
Hou, S., et al., Privacy Preserving Confidential Forensic Investigation for Shared or Remote Servers, 2011 Seventh International Conference on Intelligent Information Hiding and Multimedia Signal Processing, Oct. 14, 2011, pp. 379-383.
Navarro-Arribas, G., et al., Information Fusion in Data Privacy: A Survey, Information Fusion,13, 2012, pp. 235-244.

\* cited by examiner

SYSTEMS AND METHODS FOR DATA LOSS PREVENTION WHILE PRESERVING PRIVACY

BACKGROUND

Field

The subject matter discussed herein relates generally to methods and systems of data loss prevention while also preserving privacy, and more particularly, to a protocol between an external host and an enterprise to perform data loss prevention in a manner that protects private information.

Related Art

In the related art, enterprises must employ technique to prevent leakage, loss or oversharing of sensitive data. Related approaches include data loss prevention or detection ("DLP") systems, in which enterprises implement algorithms to detect and prevent data loss. The related art algorithms include straight or context aware pattern matching approaches. For example, Enterprise A may wish to protect the privacy of data, such as account names, numbers, or other private information. Thus, for any outgoing data the enterprise (e.g., email, download, export), Enterprise A runs software containing the algorithm to attempt to determine whether data loss has occurred (e.g., sending of account numbers, names, etc.).

However, the related art approaches have various problems and disadvantages. For example, related art pattern matching algorithms are not capable of determining which data is considered sensitive by the entity being protected (e.g., the enterprise itself, or a user at the enterprise). Thus, the related art approaches result in missed detections and high level of noise. In the above example, there is a risk that Enterprise A may fail to detect a candidate for data loss, or may characterize outgoing data as a data loss, when it is not actually a data loss. In one situation, a member of Enterprise A may have private information (e.g., personal account information not related to Enterprise A) that appears to be similar to the information owned by Enterprise A. Due to the similarity, Enterprise A characterizes the private information of the member as a data leakage, when it is not a data leakage.

Other related art approaches involve external hosts, such as DLP vendors or hosting companies, including cloud service providers, which receive a policy or rules from the enterprise or data owners that specify the sensitive data that is a potential leak. For example, Enterprise A may contract External Host B to check the information of Enterprise A for data leakage, and report the result to Enterprise A.

However, these related art approaches also have problems and disadvantages. For example, the enterprise or data owner must provide the sensitive data to a third party, which results in a risk of disclosing the sensitive data to the DLP external host (e.g., loss prevention system vendor, servicing or hosting company). In the above example, External Host B has the sensitive data of Enterprise A. Thus, the sensitive data of Enterprise A is disclosed to a third party outside of the firewall of Enterprise A, and Enterprise A cannot control what happens to the sensitive data at External Host B. Further, if detection patterns of Enterprise A are disclosed to an external DLP instead of the actual sensitive data, the result may also be a high level of noise (e.g., private information incorrectly characterized as data leakage).

SUMMARY

The subject matter includes computer-implemented methods for detecting data leakage, including receiving, at a host external to a firewall of an enterprise, a data communication originating from an online account of a user device associated with the enterprise; the host performing an analysis to determine that the data communication is a candidate data leakage, based on a context of the data communication; and the host encrypting the data communication and providing the host-encrypted data communication to a software agent at the enterprise. The computer-implemented methods also include, in response to receiving the host-encrypted data communication, and by using a common encryption key, the software agent encrypting a database of enterprise information and re-encrypting the host-encrypted data communication; providing the software agent-encrypted database of enterprise communication and the re-encrypted data communication to the host; and the host decrypting a host-encrypted aspect of the re-encrypted data communication to generate a software agent-encrypted data communication. Additionally, the computer-implemented method includes performing a matching operation to determine whether a match exists between the encrypted database of information and the software agent-encrypted data communication; for the match determined to exist, the host reporting the match to the software agent, and the software agent taking a first action; and for the match determined to not exist, the host taking a second action.

The subject matter also includes a computer-implemented method of detecting data leakage at a host external to a firewall of an enterprise, including receiving, a data communication originating from an online account of a user device associated with the enterprise; performing an analysis to determine that the data communication is a candidate data leakage, based on a context of the data communication; encrypting the data communication, and providing the host-encrypted data communication to a software agent at the enterprise; and receiving a software agent-encrypted database of enterprise communication and the host-encrypted data communication, re-encrypted by the software agent. The computer-implemented method also includes decrypting a host-encrypted aspect of the re-encrypted data communication to generate a software agent-encrypted data communication; performing a matching operation to determine whether a match exists between the encrypted database of information and the software agent-encrypted data communication; for the match determined to exist, reporting the match to the software agent; and for the match determined to not exist, the host taking an action.

Additionally, the subject matter includes a computer-implemented method of detecting data leakage from an enterprise having a software agent, including receiving, from a host external to a firewall of the enterprise, a host-encrypted data communication that originated from an online account of a user device associated with the enterprise; using a common encryption key, encrypting a database of enterprise information and re-encrypting the host-encrypted data communication; providing the encrypted database of enterprise communication and the re-encrypted data communication to the host; receiving a report from the host indicative of a match existing between the encrypted database of information and the re-encrypted data communication; and taking a first action.

The methods are implemented using one or more computing devices and/or systems. The methods may be stored in computer-readable media.

The subject matter also includes a system for detecting data leakage at a host external to a firewall of an enterprise, including the host external to the firewall of the enterprise including a hardware processor and having executable instructions stored on a computer-readable medium. The instructions at the host include receiving, a data communication originating from an online account of a user device associated with the enterprise; performing an analysis to determine that the data communication is a candidate data leakage, based on a context of the data communication; encrypting the data communication, and providing the host-encrypted data communication to a software agent at the enterprise; and receiving a software agent-encrypted database of enterprise communication and the host-encrypted data communication, re-encrypted by the software agent. The instructions further include decrypting a host-encrypted aspect of the re-encrypted data communication to generate a software agent-encrypted data communication; performing a matching operation to determine whether a match exists between the encrypted database of information and the software agent-encrypted data communication; for the match determined to exist, reporting the match to the software agent; and for the match determined to not exist, the software agent taking a first action. Further, the enterprise includes a hardware processor and having executable instructions stored on a computer-readable medium, receiving, from the host external to a firewall of the enterprise, the host-encrypted data communication; using a common encryption key, encrypting a database of enterprise information and re-encrypting the host-encrypted data communication, and providing the software agent-encrypted database and the re-encrypted data communication to the host; receiving a report from the host indicative of the match existing between the encrypted database of information and the software agent-encrypted data communication; and taking a second action.

Additionally, the subject matter includes a systems and methods for detecting data leakage, including, mean for receiving, at a host external to a firewall of an enterprise, a data communication originating from an online account of a user device associated with the enterprise, the host performing an analysis to determine that the data communication is a candidate data leakage, based on a context of the data communication, the host encrypting the data communication and providing the host-encrypted data communication to a software agent at the enterprise, and in response to receiving the host-encrypted data communication, and by using a common encryption key, the software agent encrypting a database of enterprise information and re-encrypting the host-encrypted data communication; means for providing the software agent-encrypted database of enterprise communication and the re-encrypted data communication to the host, the host decrypting a host-encrypted aspect of the re-encrypted data communication to generate a software agent-encrypted data communication; means for performing a matching operation to determine whether a match exists between the encrypted database of information and the software agent-encrypted data communication, for the match determined to exist, the host reporting the match to the software agent, and the software agent taking a first action, and for the match determined to not exist, the host taking a second action.

According to the subject matter, the agent does not become aware of the cleartext data communication, and the host does not become aware of the cleartext information in the database of the enterprise.

Also, a privacy preserving set intersection algorithm is employed by the host to perform the matching.

Further, the host may only partially encrypt the data communication, and leaves some portion as the original cleartext. Alternatively, the host may fully encrypt the data communication.

Additionally, the software agent may add noise into the encrypted database and sends it to the host.

Further, a Bloom filter may be used at the context-based analysis by the host, to determine that the data communication is a candidate.

The software agent may also re-order the numbers in the re-encryption of the host-encrypted data communication.

Additionally, the first action by the software agent includes deleting the message, quarantining the message, or sending the message to the recipient with an alert, and the second action by the host includes not reporting the result to the software agent (e.g., indicative of noise or a personal account of the user at the enterprise).

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for data loss prevention while preserving privacy.

Aspects of the example implementations relate to systems and methods for detecting and/or preventing data leakage, loss or oversharing, including classic pattern matching and context aware sensitive information detection with assistance from the party under protection. The systems and methods are performed in an automatic, privacy preserving manner. For example, but not by way of limitation, the example systems and methods may employ cryptography, including but not limited to, privacy preserving set intersection algorithms. More specifically, a privacy preserving set intersection algorithm may be an algorithm or a method that allows for the determination of an intersection of two (or more) sets of data belonging to different parties, without either party gaining knowledge of the other party's full data set.

In the related art, a first Company A may host documents for a second company B. Company A would like to provide a DLP service (e.g., preventing the loss of sensitive data such as but not limited to corporate credit card numbers associated with company B). Company A may be able to detect all numbers that look like credit card numbers in company B's shared or emailed documents. However, those numbers may include numbers that are not credit card numbers (e.g., noise), or credit card numbers that are not associated with Company, but are the personal credit card numbers of members (e.g., employees) of Company B (e.g., results not relevant to Company B).

The inclusion of such numbers may potentially expose personal, sensitive information to company B (for example, a member associated with company B might send a document containing sensitive financial information, via the member's corporate email account). While Company B could address the foregoing issue by providing Company A with the database of corporate credit card numbers to detect, such an action would expose the private sensitive information of Company B to Company A.

According to the example implementations, a privacy preserving set intersection protocol is employed. In the foregoing example, Company A only shares encrypted results with company B (e.g., without sharing the key), and Company B only shares encrypted corporate card numbers with Company A. Depending on the implementation of the privacy preserving set intersection protocol, the result is either the number of elements present in both sets, or the list of exact elements present in both sets. Thus, the sets themselves are not revealed to either party. As a result, the privacy of individual users and Company A is preserved, as not all findings are reported to company B, and the privacy of Company B is also preserved, as the corporate card database is not shared with Company A.

An example use case that implements the above-explained naive protocol as provided as follows. While the specific data and context are provided herein for illustrative purposes, the present example implementations are not limited thereto, and other data and/or contexts may be substituted therefor without departing from the inventive scope. Further, while credit card numbers are used for explanatory purposes, the example implementations are not limited thereto, and other sensitive data for which the privacy should be protected may be substituted therefor, including, but not limited, account identifiers, government-issued accounts (e.g., driver's license or social security number information), or other sensitive information, as would understood by those skilled in the art.

In a first operation, Company A (e.g., the DLP service provider) performs an analysis of an outgoing email. As a result of the analysis, two candidate credit card numbers are identified, 1111 (in this illustrative example, a personal credit card number of the member of Company B) and 2111 (in this illustrative example, an official credit card number of Company B, such as the credit card information of a customer of Company B). This circumstance may be due to a member of Company B sending a list of sensitive data of Company B to his or her personal account (e.g., siphoning), or a case of a user using an email account for a personal use (e.g., make an online payment for a personal purchase with a personal credit card), or even a situation where the member has a combined mailbox that includes options to communicate with both the personal account and the Company A account from a common user interface or user experience.

Company A encrypts these candidate credit numbers on key A, using a cipher with commutative properties. Accordingly, Company A sends Company B the following result: A(1111), A(2111). Thus, Company B does not receive the true (e.g., cleartext) identity of the credit card numbers, but only encrypted versions of the credit numbers.

Then, Company B (e.g., the DLP client) retrieves the database of its corporate card numbers (e.g., 2111, 2112 and 2113), and encrypts the database on key B. Company B also encrypts the data it received from company A (i.e., A(1111), A(2111)) on key B. Company B then sends the following information to Company A: B(2111), B(2112), B(2113), and B(A(1111)), B(A(2111)). As a result, Company A receives an encrypted version of the database of account numbers of Company B, along with an encrypted version (using key B) of the candidate credit card numbers that Company A initially sent to Company B as A(1111), A(2111).

After receiving B(2111), B(2112), B(2113), and B(A(1111)), B(A(2111)), Company A removes its own encryption from the double-encrypted elements B(A(1111)) and B(A(2111)), to generate B(1111) and B(2111). Company A can then compare the elements that it decrypted (e.g., B(1111) and B(2111)) to the elements that it received from company B (e.g., B(2111), B(2112), B(2113)). Based on this comparison, Company A determines that B(2111) is present in both sets. In other words, this credit card number (2111) was detected in the email by Company A, and is also in the database of accounts of Company B, whereas the other credit card number detected by Company A (1111) is not in the database of accounts of Company B.

After completion of the comparison and determination of the matching value, Company A reports a finding (B(2111)) to Company B. Because Company B has the crypto key B, it knows exactly what credit card number was found in the outgoing email (2111). However, Company A does not have, and cannot determine, the database of B's corporate card numbers, and Company B does not have any actual information associated with the encrypted results that do not match its corporate card numbers.

The foregoing example use case may include additional optional aspects. For example, only certain characteristics of findings (e.g., last 4 digits of credit card numbers) may be sent from Company A to Company, B to prevent the need to encrypt and transmit the entire database of card numbers. Further, random noise may be added to the findings by Company A, to prevent information leakage to Company B. Additionally, the order of elements could be adjusted so as to prevent company A from determining which finding represents a corporate card. According to another alternate example implementation, a client may build a Bloom filters for the databases of sensitive information. This approach may be implemented for detecting large data leaks (e.g., many card numbers in a single message).

It is noted that Company A may host not only the DLP services for Company B, but may also more generally be a host (e.g., cloud services provider) for Company B, and may thus host services, applications and data (e.g., Company A is a cloud host for Company B). However, even in such an environment, Company A cannot access the Company B's information that is considered to be inside the "firewall" of Company B. For example, but not by way of limitation, an encryption approach may be employed to create a firewall for Company B, when Company A is hosting Company B.

The example implementations may have various benefits and advantages. For example, but not by way of limitation, privacy may be preserved for the member of the DLP client (e.g., individual users), and privacy may also be preserved for the DLP client and the DLP service provider. Thus, DLP can be provided without requiring reliance on a trusted external party (e.g., third party to process and be made aware of the actual content or cleartext of the outgoing data). Thus, privacy of the sensitive information is preserved. The example implementations may also be incorporated in a cloud-based environment, where cloud components implementing the client side of the protocol may be deployed in a uniform, scalable manner.

Figure 1:
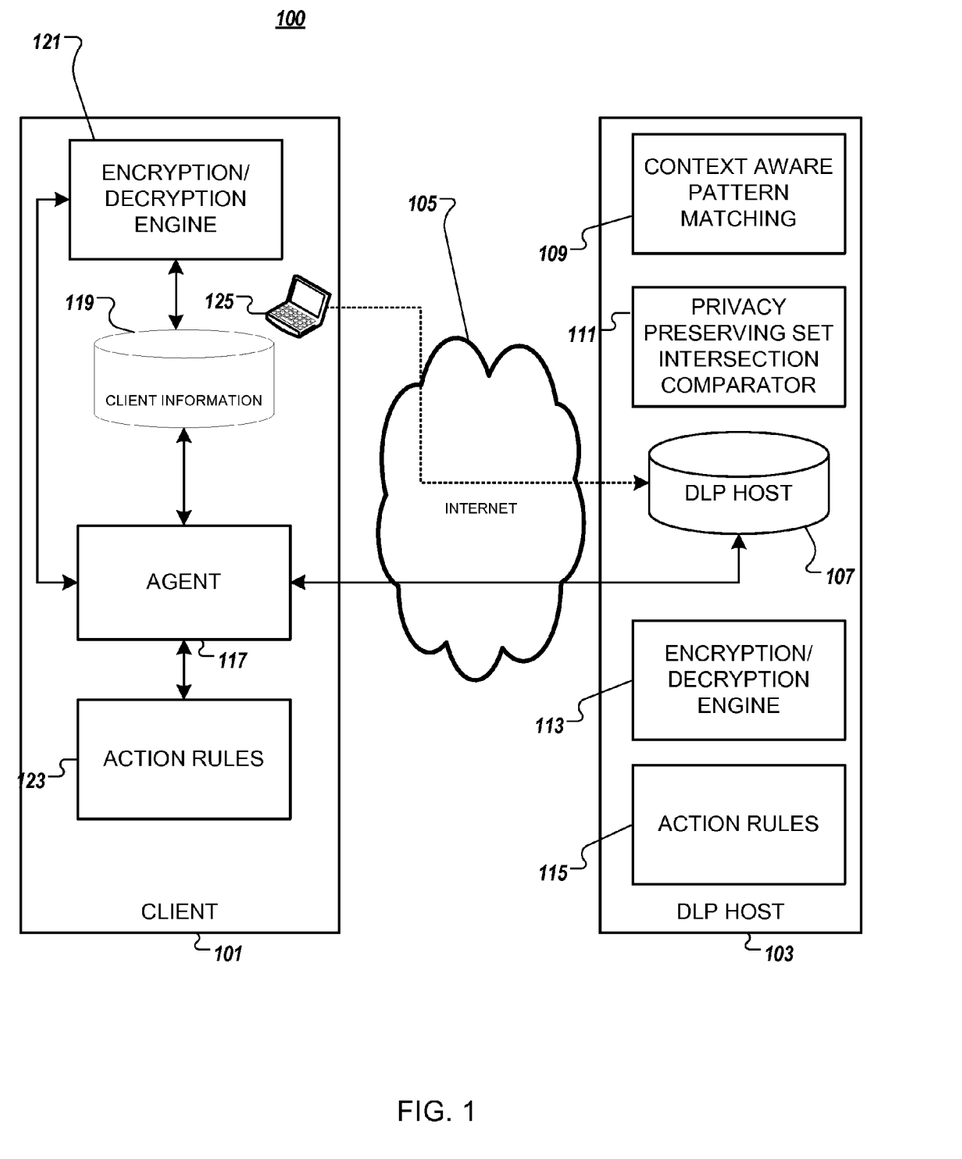
FIG. 1 shows a system having a client and a host having a protocol according to an example implementation.

FIG. 1 a system 100 according to an example implementation. More specifically, a client 101 (e.g., a DLP client) and a DLP host 103 (e.g., a DLP service provider) are coupled via a network such as the Internet 105. The DLP host 103 includes a DLP host server 107, context aware pattern matching 109, privacy preserving set intersection comparator 111, encryption/decryption engine 113, and action rules 115. The client 101 includes an agent 117, client information 119, encryption/decryption engine 121, action rules 123, and a device of a member 125. The DLP host 103 is not within the firewall of the client 101. According to the protocol, some operations are performed by the agent 117 at the client 101, and other operations are performed by the DLP host server 107 at the DLP host 103.

In the system 100, outgoing data that is being sent from a device of a member 125 of the client 101, via the Internet 105, is received by the DLP host server 107 of the DLP host 103. For example, but not by way of limitation, this outgoing data may include an email of a user who is a member of the DLP client, and may include one or more candidate credit card numbers, or other sensitive information that may be private.

Upon receipt, the DLP host server 107 employs context aware pattern matching 109 to perform a context-based analysis of the outgoing data, to search for candidates of leaked information. For example, but not by way of limitation, the context aware pattern matching 109 may attempt to look for patterns (e.g., number of consecutive characters or the values of a part or all of the consecutive characters). Optionally, the DLP host 103 may perform the analysis to determine that the data communication is the candidate data leakage by the application of the above-noted Bloom filter, to determine that the data communication is the candidate data leakage.

For the outgoing data containing candidate leaked information, the encryption/decryption engine 113 is employed to encrypt the candidate leaked information based on a key that is at the DLP host 103, and is not provided to the client 101. The DLP host 107 then provides the encrypted candidate leaked information to the agent 117 of the client 101.

The agent 117, upon receiving the encrypted candidate leaked information, applies the encryption/decryption engine 121 to perform a second encryption of the received, once-encrypted candidate leaked information, and also encrypts client information 119 (e.g., a database of the client information). The agent 117 has access to the client information 119, and is resident in the environment of the client 101 (e.g., cloud space of client 101, as hosted by the DLP host 103, or another host). The encryption/decryption engine 121 uses a key that is at the client 101 and is not provided to the DLP host 103. The agent 117 sends the twice-encrypted candidate leaked information and the encrypted client information to the DLP host 103 via a network such as the Internet 105.

The DLP host server 107, upon receiving the twice-encrypted candidate leaked information and the encrypted client information, performs a decryption operation, via the encryption/decryption engine 113, on the twice-encrypted candidate leaked information, to remove the encryption that it had initially applied. As a result, the encrypted candidate leaked information and the encrypted client information, both encrypted by the client 101, remains at the DLP host 103.

The DLP host server 107 then applies the privacy preserving set intersection comparator 111 to perform a matching operation on the values of the encrypted candidate leaked information and the encrypted client information. If a match is determined to exist as a result of the matching operation, the DLP host server 107 provides a report to the agent 117 of the client 101 that includes the encrypted matching candidate leaked information, and the agent applies action rules 123 to determine an action to be taken, as explained in greater detail below. If a match is determined to not exist as a result of the matching operation, action rules 115 are applied, and the DLP host takes an action, as explained in greater detail below.

In the example implementations, the DLP host 103 is host external to a firewall of the client 101. Further, the client may include, but is not limited to, an enterprise. Accordingly, the outgoing data may include, but is not limited to, a data communication originating from an online account of a user device associated with the enterprise. Thus, the DLP host 103 may perform an analysis to determine that the data communication is a candidate data leakage, based on a context of the data communication, and encrypt the data communication to provide the host-encrypted data communication to the software agent 117 at the enterprise.

Further, in response to receiving the host-encrypted data communication, and by using a common encryption key, the software agent 117 may encrypt a database of enterprise information and re-encrypt the host-encrypted data communication, and provide the software agent-encrypted database of enterprise communication and the re-encrypted data communication to the DLP host 103. The host may decrypt a host-encrypted aspect of the re-encrypted data communication to generate a software agent-encrypted data communication, and perform a matching operation to determine whether a match exists between the encrypted database of information and the software agent-encrypted data communication.

For the match determined to exist, the DLP host 103 may report the match to the software agent 117, and the software agent 117 may take a first action. The action by the software agent 117 may include one or more of deleting the data communication, quarantining the data communication, and sending the data communication to a recipient with an alert. For example, but not by way of limitation, the originating sender of the data communication may be alerted when attempting to send sensitive information (for example, via a dialog box or message popup providing a prompt to edit the message and remove sensitive data before sending), or an administrator of the client 101 may be alerted that a leak may have taken place. However, the example implementation is not limited thereto, and other alerts as would be understood by those skilled in the art may be substituted therefor without departing from the inventive scope.

For the match determined to not exist, the DLP host 103 may take a second action. The second action by the DLP host 103 may include not providing a report to the software agent 117.

As noted above, the software agent at the client 101 (e.g., enterprise) is not provided with a key used by the DLP host 103 encrypting the data communication originating from the online account, and the DLP host 103 is not provided with the common encryption key of the software agent 117.

According to an example implementation, the DLP 103 host may partially encrypt the data communication, and leaves an unencrypted portion of the data communication as cleartext. Further, the DLP host 103 may provide the partially encrypted data communication and the cleartext to the software agent. As a result, the processing requirements may be reduced, because the entire string of every candidate leaked information in a data communication need not be encrypted, transmitted and decrypted between the DLP host 103 and the client 101.

As noted above, the software agent 117 may add noise into the encrypted database and send the encrypted database with the noise to the DLP host 103. Similarly, the software agent 117 may re-order values in the host-encrypted data communication during the re-encryption of the host-encrypted data communication. Taking such an approach may make it more difficult for the DLP host 103 to obtain information about the actual content of the database.

Figure 2:
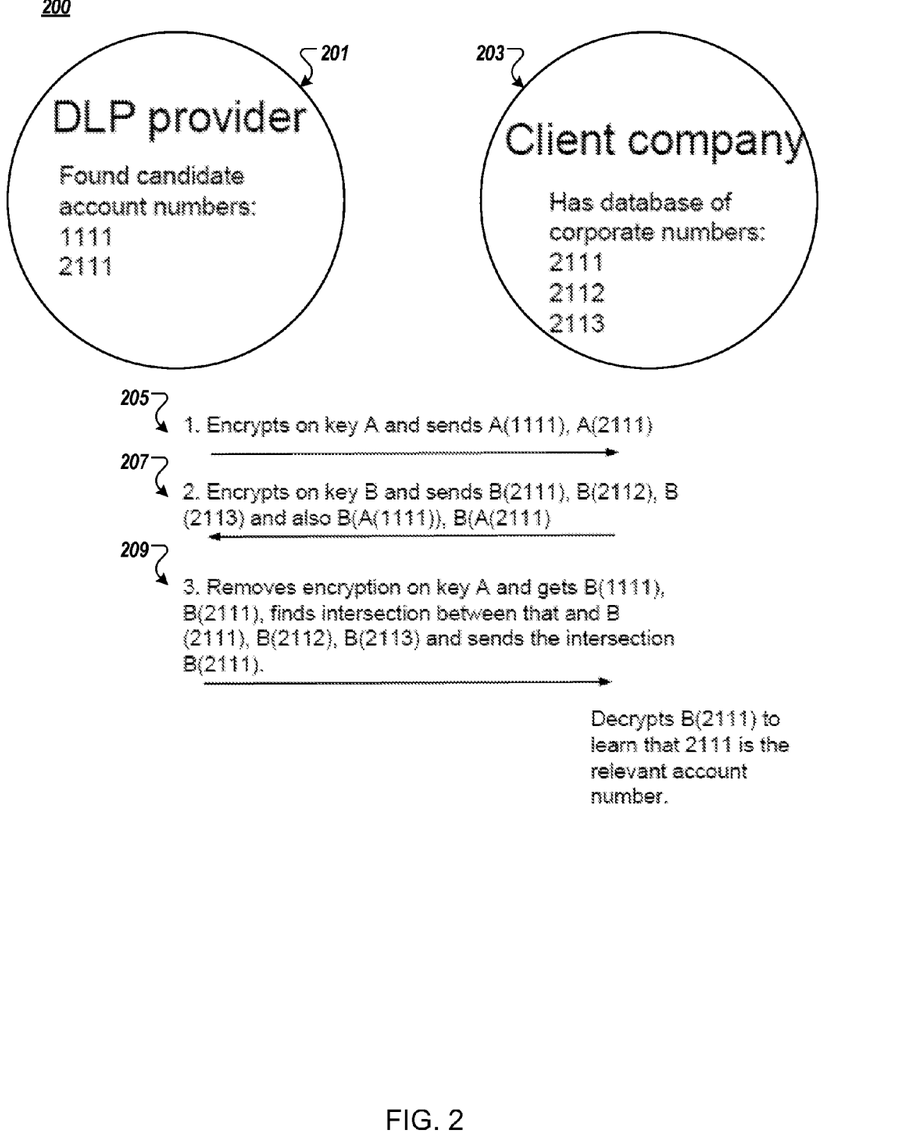
FIG. 2 shows an example for the protocol according to the example implementation.

FIG. 2 illustrates an example of a use case 200 according to the foregoing example implementation. At 201, a DLP provider, implementing the foregoing example implementation as well as the processes described below and in FIGS. 3-6, has found candidate account numbers bearing the values "1111" and "2111".

At 203, a client company has a database of corporate numbers that include values "2111", "2112" and "2113". The client company at 203 has not been provided the above-noted information of the DLP provider at 201, and the DLP provider at 201 has also not been provided the above-noted information of the client company at 203.

At 205, the DLP provider encrypts the candidate account numbers on key A, and provides the encrypted values A(1111), A(2111) to the client company. At 207, the client company encrypts the values in its database of corporate numbers on key B, which is different from key A, and provides the encrypted values B(2111), B(2112), B(2113) to the DLP provider. Additionally, the client company encrypts the encrypted candidate account numbers A(1111), A(2111) using key B, and provides the result B(A(1111)), B(A(2111)) to the DLP provider.

At 209, the DLP provider removes the encryption on key A, so as to obtain B(1111), B(2111). The DLP provider then finds an intersection between these values B(1111), B(2111) and the encrypted corporate numbers B(2111), B(2112), B(2113). The DLP provider sends the intersection B(2111) to the client company. The client company decrypts B(2111), and can thus determine that 2111 is the relevant account number.

Figure 3:
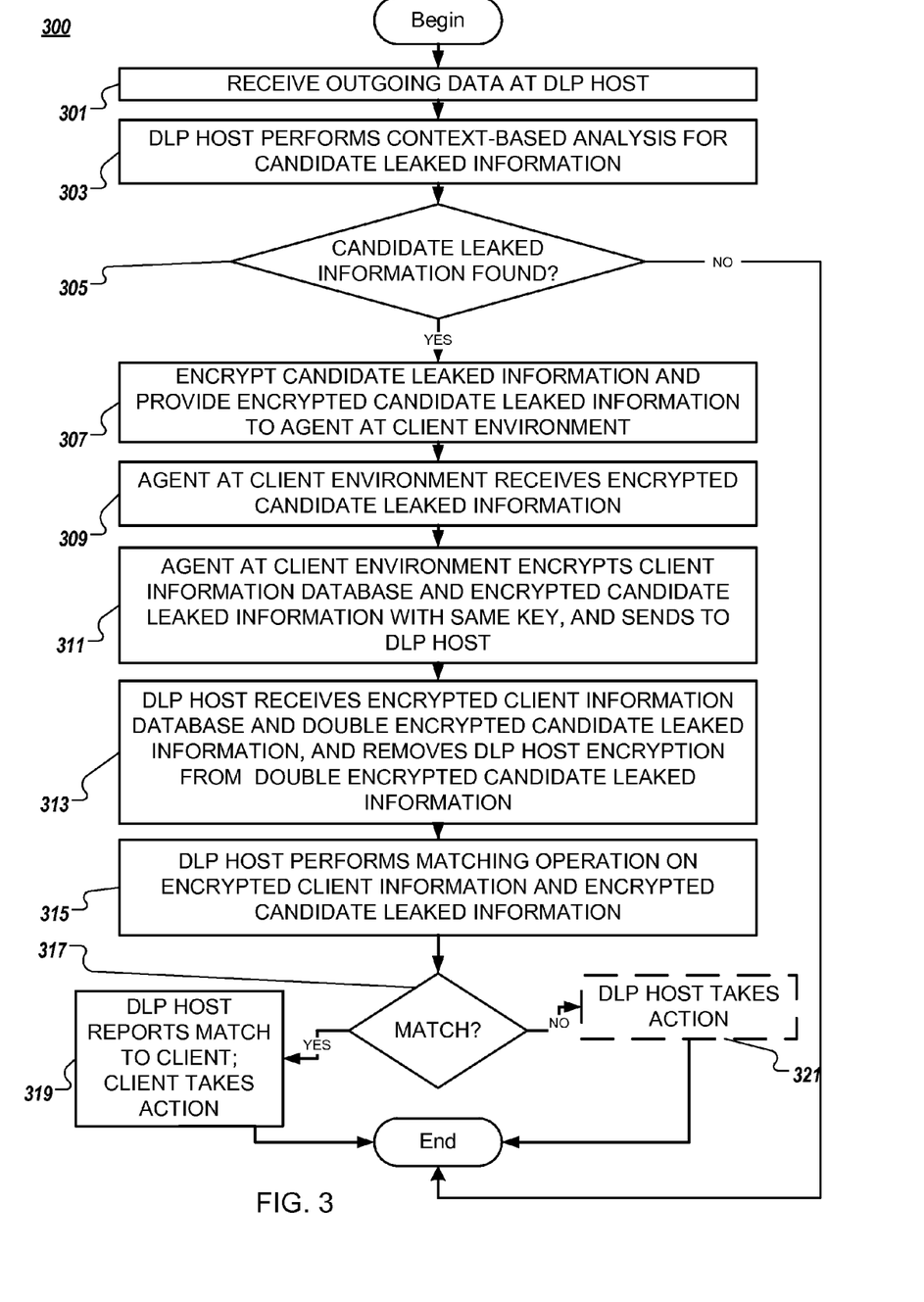
FIG. 3 shows an example process of the protocol including the client and the host according to an example implementation.

FIG. 3 illustrates a process 300 according to an example implementation of the system 100. At 301, outgoing data that has not been released to be transmitted to the recipient, and that is being sent from a device of a member of the DLP client, is received by the DLP host. The DLP host does not receive or store additional information regarding whether the outgoing data includes information that is associated with customers of the client, for example. At 303, once received, a context aware pattern matching operation is performed (e.g., a context-based analysis) on the outgoing data, to search for candidates of leaked information.

At 305, if no candidate leaked information is found in the outgoing data, the process is ended (e.g., the DLP host has determined that there is no leak in the outgoing data). If the outgoing data is determined to include candidate leaked information at 305, then the process proceeds to 307.

At 307, the candidate leaked information is encrypted, based on a key that is at the DLP host and is not provided to the client, and provided to the client. For example, at 309, an agent (e.g., a software program at the client that performs instructions for the client) may receive the encrypted candidate leaked information.

At 311, the agent uses a key to perform a second encryption of the received, once-encrypted candidate leaked information, and also encrypts client information (e.g., the database of the client information). The key that is used by the agent is not provided to the DLP host, and thus, the DLP host cannot decrypt the content that was encrypted by the agent. Also at 311, the agent provides the twice-encrypted candidate leaked information and the encrypted client information to the DLP host.

At 313, the DLP host receives the twice-encrypted candidate leaked information and the encrypted client information, performs a decryption operation so as to remove the encryption that it initially applied on the twice-encrypted candidate leaked information.

At 315, a matching operation is performed (e.g., by privacy preserving set intersection comparator) on the values of the encrypted candidate leaked information and the encrypted client information.

At 317, it is determined whether a match has been found. If a match is determined to exist as a result of the matching operation at 317, then at 319 the DLP host provides a report to the agent that includes the encrypted matching candidate leaked information, and the agent applies determines an action to be taken, as explained above. If a match is determined to not exist as a result of the matching operation at 317, then at 321 the DLP host optionally takes an action, as explained above.

Figure 4:
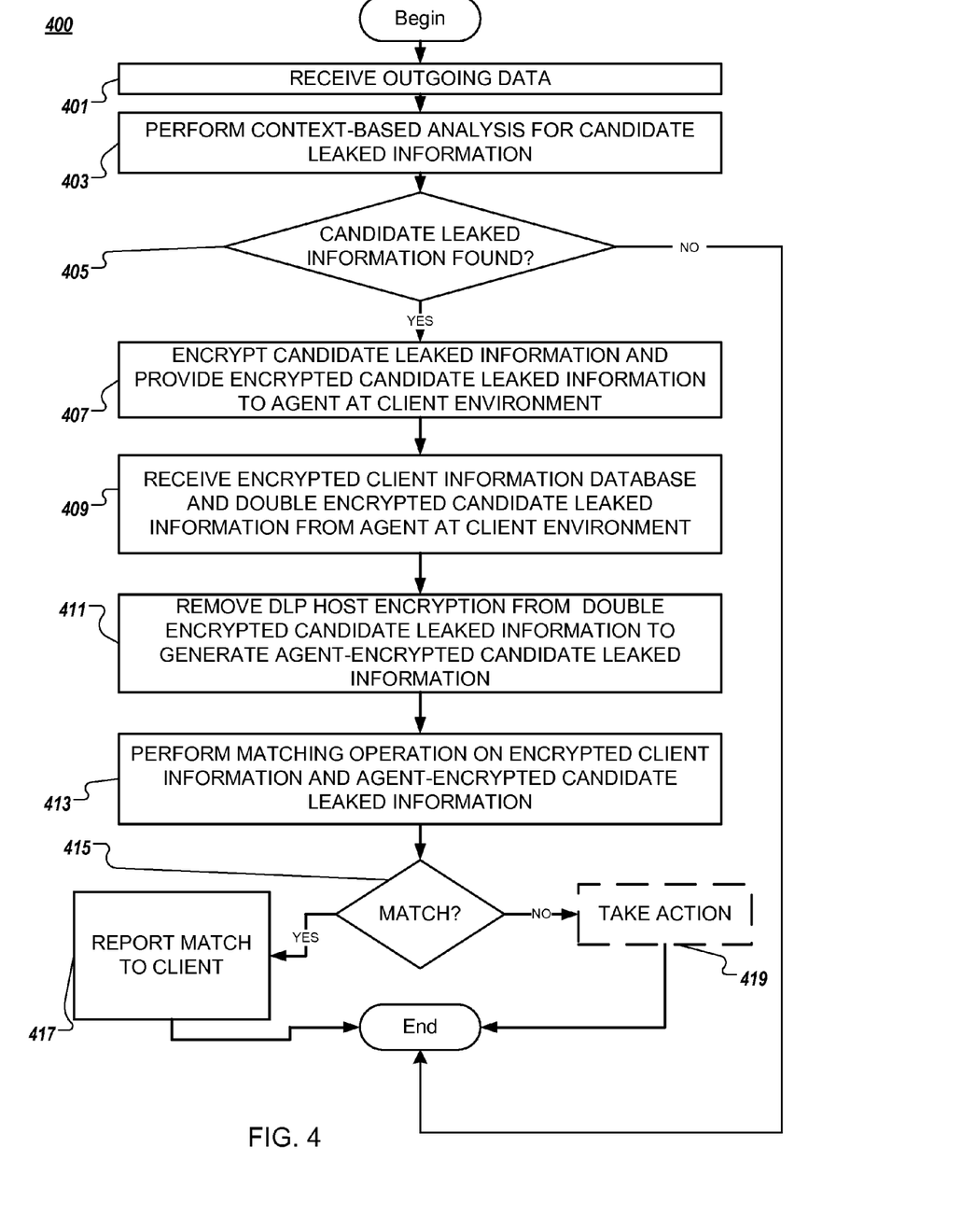
FIG. 4 shows an example process of the protocol including the host according to an example implementation.

FIG. 4 illustrates a process 400 according to an example implementation of the DLP host 103. At 401, outgoing data is received from a device of a member of the DLP client. At 403, once received, a context aware pattern matching operation is performed (e.g., a context-based analysis) on the outgoing data, to search for candidates of leaked information.

At 405, if no candidate leaked information is found in the outgoing data, the process is ended (e.g., the DLP host has determined that there is no leak in the outgoing data). If the outgoing data is determined to include candidate leaked information at 405, then the process proceeds to 407.

At 407, the candidate leaked information is encrypted (e.g., potential leak of data), based on a key that is at the DLP host and is not provided to the client, and provided to the client (e.g., an agent at the client).

At 409, the DLP host receives twice-encrypted candidate leaked information and the encrypted client information, which has been encrypted using a key that is not available to the DLP host. For example, but not by way of limitation, an agent may use a key to perform a second encryption of the received, once-encrypted candidate leaked information, and also encrypts client information (e.g., the database of the client information). The key that is used by the agent is not provided to the DLP host, and thus, the DLP host cannot decrypt the content that was encrypted by the agent.

At 411, the DLP host performs a decryption operation so as to remove the encryption that it initially applied on the twice-encrypted candidate leaked information.

At 413, a matching operation is performed (e.g., by the privacy preserving set intersection comparator) on the values of the encrypted candidate leaked information and the encrypted client information.

At 415, it is determined whether a match has been found. If a match is determined to exist as a result of the matching operation at 415, then at 417 the DLP host provides a report to the agent that includes the encrypted matching candidate leaked information. If a match is determined to not exist as a result of the matching operation at 415, then at 419 the DLP host optionally takes an action, as explained above.

Figure 5:
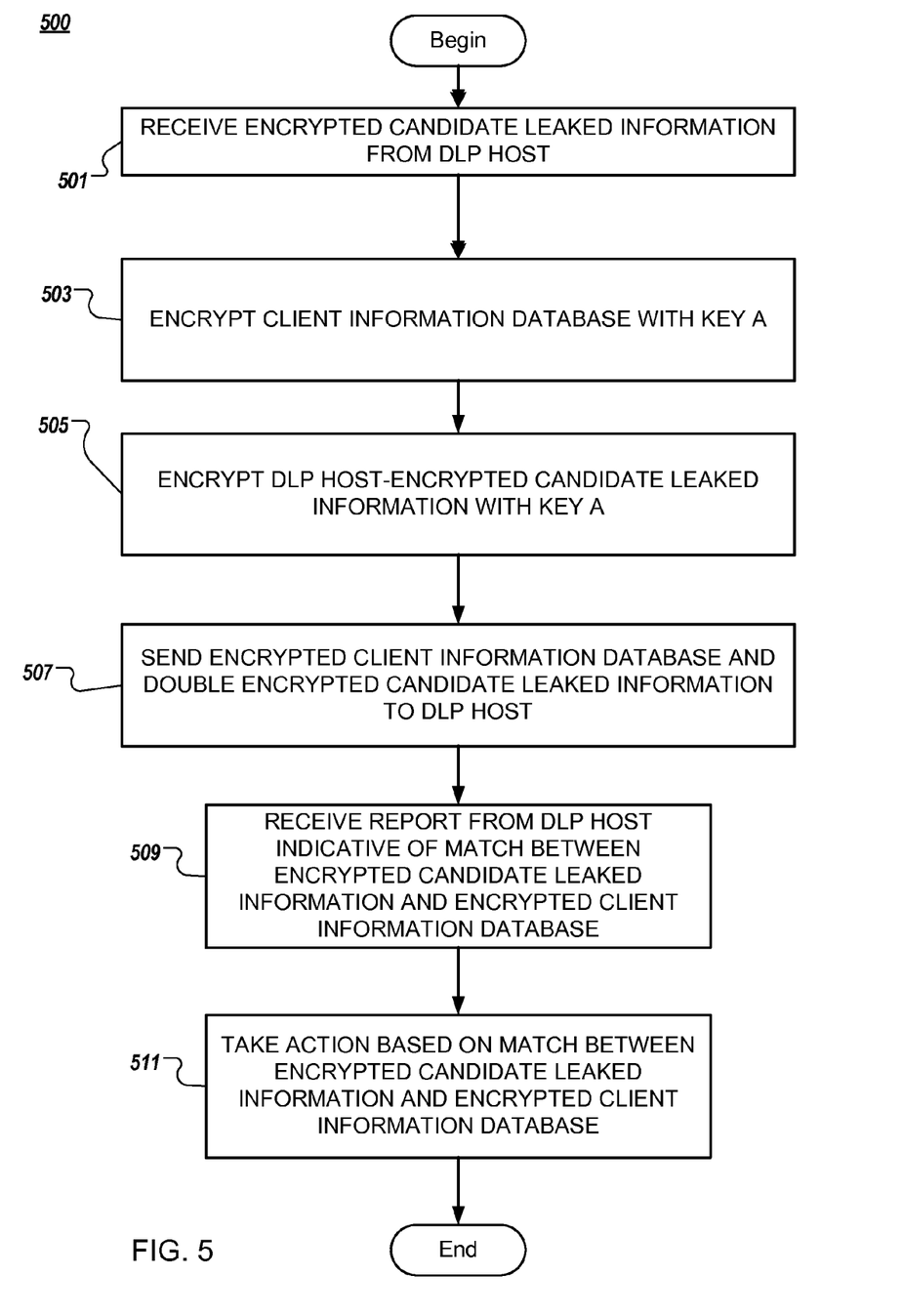
FIG. 5 shows an example process of the protocol including the client according to an example implementation.

FIG. 5 illustrates a process 500 according to an example implementation of the client 101. At 501, an agent at the client receives encrypted candidate leaked information from a DLP host. The agent, and the client for that matter, are not able to access the key that was used to encrypt the candidate leaked information, and thus cannot determine the actual value of the candidate leaked information.

At 503, the agent uses a key to perform a second encryption of the received, once-encrypted candidate leaked information, and at 505 encrypts client information (e.g., the database of the client information). The key that is used by the agent is not provided to the DLP host, and thus, the DLP host cannot decrypt the content that was encrypted by the agent.

At 507, the agent provides the twice-encrypted candidate leaked information and the encrypted client information to the DLP host.

At 509, the agent receives a report from the DLP host that includes the encrypted matching candidate leaked information that matches the encrypted information of the client database.

At 511, the agent applies determines an action to be taken, as explained above.

In some examples, the foregoing processes illustrated in FIGS. 3-5 may be implemented with different, fewer, or more blocks. Processes 300, 400, and/or 500 may be implemented as computer executable instructions, which can be stored on a medium, loaded onto one or more processors of one or more computing devices, and executed as a computer-implemented method.

Figure 6:
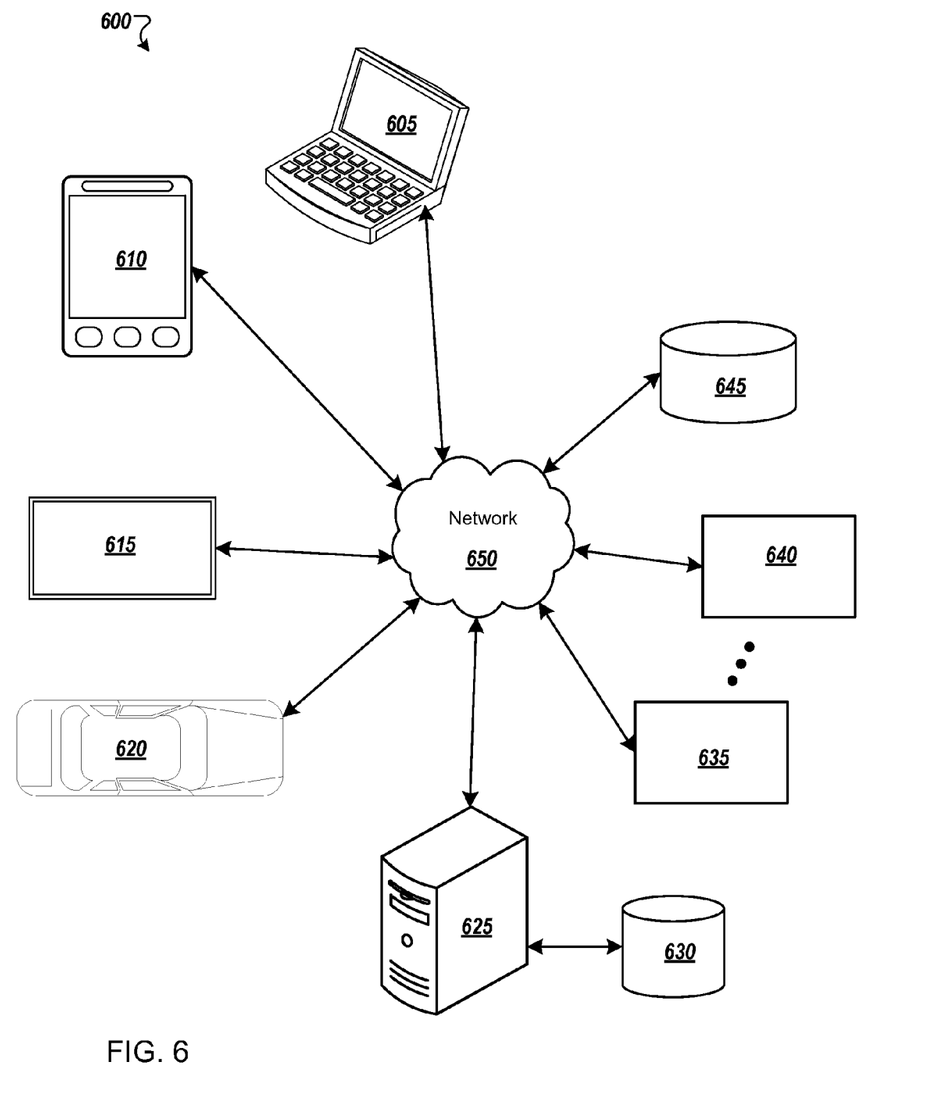
FIG. 6 shows an example environment suitable for some example implementations.

FIG. 6 shows an example environment suitable for some example implementations. Environment 600 includes devices 605-645, and each is communicatively connected to at least one other device via, for example, network 660 (e.g., by wired and/or wireless connections). Some devices may be communicatively connected to one or more storage devices 630 and 645.

An example of one or more devices 605-645 may be computing devices 705 and/or 805 described below in FIGS. 7 and 8, respectively. Devices 605-645 may include, but are not limited to, a computer 605 (e.g., a laptop computing device), a mobile device 610 (e.g., smartphone or tablet), a television 615, a device associated with a vehicle 620, a server computer 625, computing devices 635-640, storage devices 630 and 645.

In some implementations, devices 605-620 may be considered user devices associated with the users of the enterprise (e.g., devices used by users to access services and/or issue requests, such as on a social network, or to access their personal online information while within the firewall of the enterprise). Devices 625-645 may be devices associated with service providers (e.g., used by the external host to provide services as described above and with respect to FIGS. 3-5, and/or store data, such as webpages, text, text portions, images, image portions, audios, audio segments, videos, video segments, and/or information thereabout).

For example, a user (e.g., Alice) who is an employee of the enterprise may access, view, and/or share personal content that may or may not be associated with the sensitive data of the enterprise, using user device 605 or 610 on a social network supported by one or more devices 625-645. The personal content of Alice that is not associated with the enterprise may include a personal account name or number accessed from a personal account or folder (e.g., "Alice's non-work messages") within the firewall of the enterprise. The personal content of Alice that is associated with the enterprise may include an account name or number information of account holders of the enterprise, accessed from a work-related account or folder (e.g., "Alice's work messages") of Alice, within the firewall of the enterprise. A recipient that is the external host (e.g., Bob) may access and/or view Alice's shared content using device 615 or 620, in accordance with the process described above with respect to FIGS. 3-5.

Figure 7:
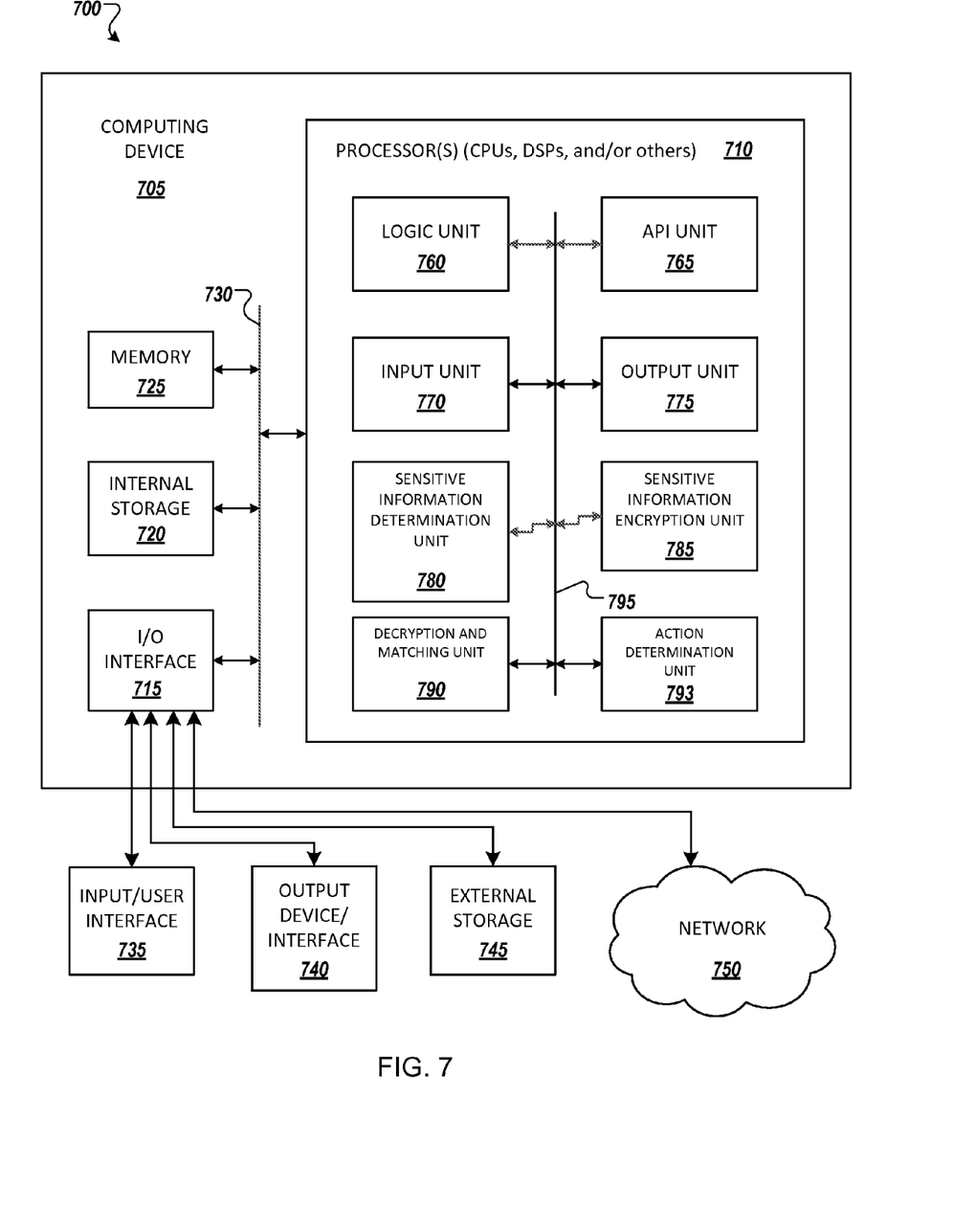
FIG. 7 shows an example computing environment with an example computing device associated with the external host for use in some example implementations.

FIG. 7 shows an example computing environment with an example computing device associated with the external host for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

The I/O interface 725 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, sensitive information determination unit 780, sensitive information encryption unit 785, decryption and matching unit 790, action determination unit 793, and inter-unit communication mechanism 795 for the different units to communicate with each other, with the OS, and with other applications (not shown). For example, sensitive information determination unit 780, sensitive information encryption unit 785, decryption and matching unit 790 and action determination unit 793 may implement one or more processes shown in FIGS. 3 and 4. The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775, sensitive information determination unit 780, sensitive information encryption unit 785, decryption and matching unit 790, and action determination unit 793).

For example, after input unit 770 has received the outgoing data that is associated with outgoing information of a member of the client, input unit 770 may use API unit 765 to communicate the user indication to sensitive information determination unit 780. For example, sensitive information determination unit 780 may, by use of context-based analysis, make a determination that the outgoing information from the client includes candidate leaked information.

Sensitive information determination unit 780 may, via API unit 765, interact with the sensitive information encryption unit 785 to encrypt the candidate leaked information. Using API unit 765, sensitive information determination unit 780 may interact with decryption and matching unit 790 to receive and decrypt the twice encrypted candidate leaked information (e.g., from the client), so that encryption applied by the sensitive information encryption unit 785 is removed, and then perform a matching operation between the encrypted candidate leaked information and encrypted client database information, to determine the presence of a match. Action determination unit 793 may determine an action to be taken when it is determined that a match is not present by the decryption and matching unit 790.

In some instances, logic unit 760 may be configured to control the information flow among the units and direct the services provided by API unit 765, input unit 770, output unit 775, sensitive information determination unit 780, sensitive information encryption unit 785, decryption and matching unit 790 and action determination unit 793 in some example implementations described above. For example, the flow of one or more processes or implementations may be controlled by logic unit 760 alone or in conjunction with API unit 765.

Figure 8:
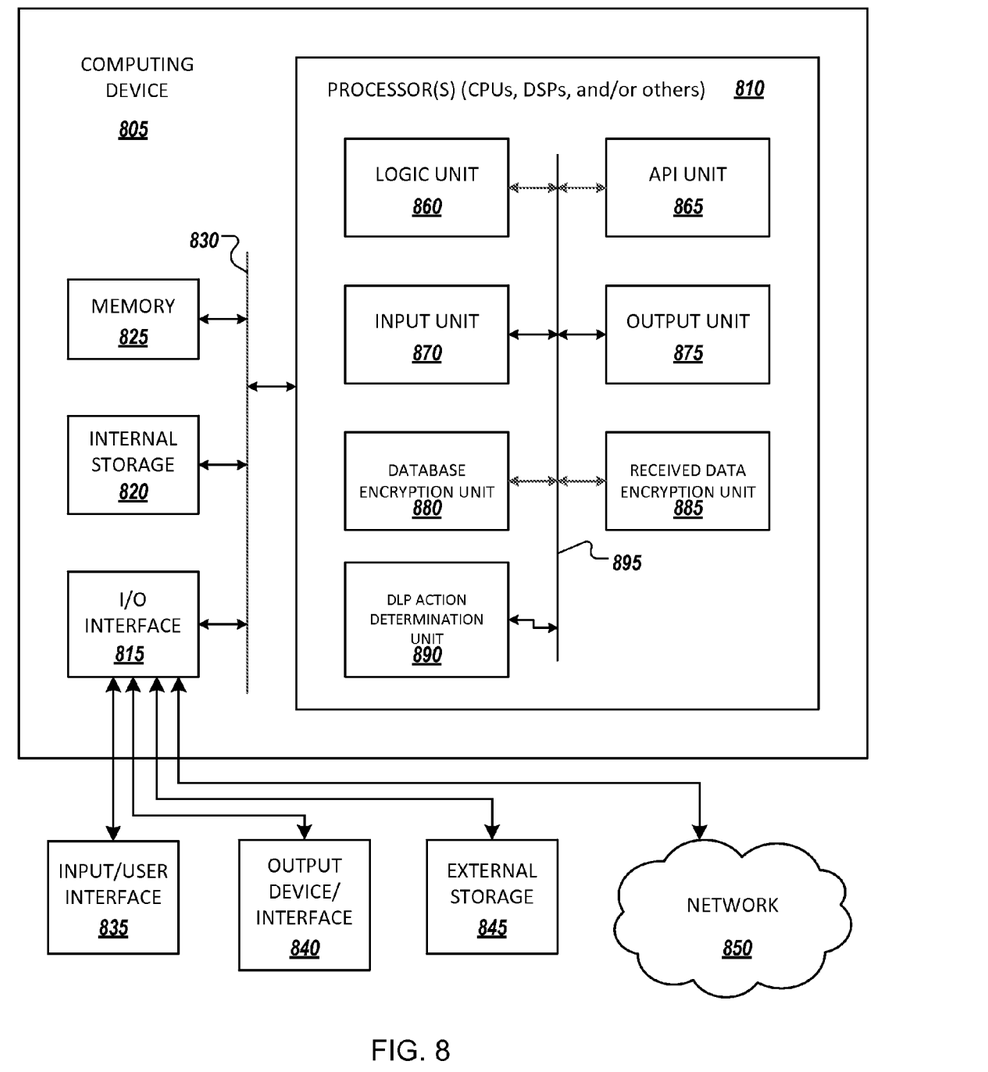
FIG. 8 shows an example computing environment with an example computing device associated with the client for use in some example implementations.

FIG. 8 shows an example computing environment with an example computing device associated with the enterprise for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

The I/O interface 825 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, database encryption unit 880, received data encryption unit 885, DLP action determination unit 890, and inter-unit communication mechanism 895 for the different units to communicate with each other, with the OS, and with other applications (not shown). For example, database encryption unit 880, received data encryption unit 885, and DLP action determination unit 890 may implement one or more processes shown in FIGS. 3 and 5. The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875, database encryption unit 880, received data encryption unit 885, and DLP action determination unit 890).

For example, after input unit 870 has received an encrypted candidate leaked information from the DLP host, input unit 870 may use API unit 865 to communicate this information to the database encryption unit 880, which encrypts the client information database. Database encryption unit 880 may, via API unit 865, interact with the received data encryption unit 885 to encrypt the encrypted candidate leaked information received from the DLP host. Using API unit 865, DLP action determination unit 890 may determine an action to be taken based on information received from the DLP host that indicates a match between the candidate leaked information and the client information database.

In some instances, logic unit 860 may be configured to control the information flow among the units and direct the services provided by API unit 865, input unit 870, output unit 875, database encryption unit 880, received data encryption unit 885, and DLP action determination unit 890 in some example implementations described above. For example, the flow of one or more processes or implementations may be controlled by logic unit 860 alone or in conjunction with API unit 865.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

In situations in which the systems discussed here collect personal information about users, or may make use of personal information, the users (e.g., user at the enterprise having both work and non-work accounts integrated together) may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method of detecting data leakage, the method comprising:
   receiving, at a host external to a firewall of an enterprise, a data communication originating from an online account of a user device associated with the enterprise;
   the host performing an analysis to determine that the data communication is a candidate data leakage, based on a context of the data communication;
   the host encrypting the data communication and providing the host-encrypted data communication to a software agent at the enterprise;
   in response to receiving the host-encrypted data communication, and by using a common encryption key, the software agent encrypting a database of enterprise information and re-encrypting the host-encrypted data communication;

providing the software agent-encrypted database of enterprise information and the re-encrypted data communication to the host;

the host decrypting a host-encrypted aspect of the re-encrypted data communication to generate a software agent-encrypted data communication;

performing a matching operation to determine whether a match exists between the encrypted database of information and the software agent-encrypted data communication;

the host configured to report the match to the software agent, and the software agent configured to take a first action, when the match is determined to exist; and the host configured to take a second action when the match is determined to not exist.

2. The computer-implemented method of claim 1, wherein the software agent at the enterprise is not provided with a key used by the host encrypting the data communication originating from the online account, and the host is not provided with the common encryption key of the software agent.

3. The computer-implemented method of claim 1, wherein the performing the matching operation comprises applying a set intersection algorithm.

4. The computer-implemented method of claim 1, wherein the host partially encrypts the data communication, and leaves an unencrypted portion of the data communication as cleartext, and provides the partially encrypted data communication and the cleartext to the software agent.

5. The computer-implemented method of claim 1, further comprising the software agent adding noise into the encrypted database and sends the encrypted database with the noise to the host.

6. The computer-implemented method of claim 1, wherein the host performing the analysis to determine that the data communication is the candidate data leakage comprises the application of a Bloom filter to determine that the data communication is the candidate data leakage.

7. The computer-implemented method of claim 1, further comprising the software agent re-ordering values in the host-encrypted data communication during the re-encryption of the host-encrypted data communication.

8. The computer-implemented method of claim 1, wherein the first action by the software agent comprises at least one of includes deleting the data communication, quarantining the data communication, and sending the data communication to a recipient with an alert.

9. The computer-implemented method of claim 1, wherein the second action by the host comprises not providing a report to the software agent.

10. A computer-implemented method of detecting data leakage at a host external to a firewall of an enterprise, the method comprising:

receiving, a data communication originating from an online account of a user device associated with the enterprise;

performing an analysis to determine that the data communication is a candidate data leakage, based on a context of the data communication;

encrypting the data communication, and providing the host-encrypted data communication to a software agent at the enterprise;

receiving a software agent-encrypted database of enterprise information and the host-encrypted data communication, re-encrypted by the software agent;

decrypting a host-encrypted aspect of the re-encrypted data communication to generate a software agent-encrypted data communication;

performing a matching operation to determine whether a match exists between the encrypted database of information and the software agent-encrypted data communication;

reporting the match to the software agent when the match is determined to exist; and the host configured to take an action when the match is determined to not exist.

11. The computer-implemented method of claim 10, wherein the performing the matching operation comprises applying a set intersection algorithm.

12. The computer-implemented method of claim 10, wherein the host partially encrypts the data communication, and leaves an unencrypted portion of the data communication as cleartext, and provides the partially encrypted data communication and the cleartext to the software agent.

13. The computer-implemented method of claim 10, wherein the host performing the analysis to determine that the data communication is the candidate data leakage comprises the application of a Bloom filter to determine that the data communication is the candidate data leakage.

14. A computer-implemented method of detecting data leakage from an enterprise having a software agent, the method comprising:

receiving, from a host external to a firewall of the enterprise, a host-encrypted data communication that originated from an online account of a user device associated with the enterprise;

using a common encryption key, encrypting a database of enterprise information and re-encrypting the host-encrypted data communication;

providing the encrypted database of enterprise information and the re-encrypted data communication to the host;

receiving a report from the host indicative of a match existing between the encrypted database of information and the re-encrypted data communication; and taking a first action when the match is determined to exist between the encrypted database of information and the re-encrypted data communication.

15. The computer-implemented method of claim 14, wherein the software agent at the enterprise is not provided with a key used by the host encrypting the data communication originating from the online account, and the host is not provided with the common encryption key of the software agent.

16. The computer-implemented method of claim 14, further comprising the software agent adding noise into the encrypted database and sends the encrypted database with the noise to the host.

17. The computer-implemented method of claim 14, further comprising the software agent re-ordering values in the host-encrypted data communication during the re-encryption of the host-encrypted data communication.

18. The computer-implemented method of claim 14, wherein the first action by the software agent comprises at least one of includes deleting the data communication, quarantining the data communication, and sending the data communication to a recipient with an alert, and wherein the first action is not taken when the match is determined to not exist between the encrypted database of information and the re-encrypted data communication.

19. A system for detecting data leakage at a host external to a firewall of an enterprise, the system comprising:
the host external to the firewall of the enterprise including a hardware processor and having executable instructions stored on a computer-readable medium, the instructions at the host comprising,
receiving, a data communication originating from an online account of a user device associated with the enterprise;
performing an analysis to determine that the data communication is a candidate data leakage, based on a context of the data communication;
encrypting the data communication, and providing the host-encrypted data communication to a software agent at the enterprise;
receiving a software agent-encrypted database of enterprise information and the host-encrypted data communication, re-encrypted by the software agent;
decrypting a host-encrypted aspect of the re-encrypted data communication to generate a software agent-encrypted data communication;
performing a matching operation to determine whether a match exists between the encrypted database of information and the software agent-encrypted data communication;
the match is capable of being reported to the software agent when the match is determined to exist; and
the software agent is configured to take a first action when the match is determined to exist; and
the enterprise including a hardware processor and having executable instructions stored on a computer-readable medium
receiving, from the host external to a firewall of the enterprise, the host-encrypted data communication;
using a common encryption key, encrypting a database of enterprise information and re-encrypting the host-encrypted data communication, and providing the software agent-encrypted database and the re-encrypted data communication to the host;
receiving a report from the host indicative of the match existing between the encrypted database of information and the software agent-encrypted data communication; and
taking a second action.

20. The system of claim 19, wherein the software agent at the enterprise is not provided with a key used by the host encrypting the data communication originating from the online account, and the host is not provided with the common encryption key of the software agent.

* * * * *